April 28, 1953     A. RUTISHAUSER     2,636,568
COUPLING MEANS FOR POWER TAKE-OFFS
Filed Oct. 9, 1950

INVENTOR:
Arnold Rutishauser
by
Atty.

Patented Apr. 28, 1953

2,636,568

UNITED STATES PATENT OFFICE 2,636,568

COUPLING MEANS FOR POWER TAKE-OFFS

Arnold Rutishauser, Zollikon (Zurich), Switzerland, assignor to "Rapid" Motormaher A.-G., Zurich, Switzerland Application October 9, 1950, Serial No. 189,157
In Switzerland October 31, 1949

1 Claim. (Cl. 180—53)

Machines, machine parts or sets thereof in practice often have to be interconnected and disconnected again in cases where various combinations of parts to be coupled have to be made. In such cases, it is desirable to do such mounting and demounting quickly without the aid of tools and without appreciable effort on the part of the operator in moving the parts to be coupled into their coupling positions. In the case of farming machinery for example, auxiliary implements or attachments, such as winches, tree spraying apparatus and the like often have to be coupled to a tractor for temporary use.

The present invention permits of quickly coupling such parts in that the latter comprise abutment means which are alined and brought into interengagement by swinging them into the proper coupling positions. Conveniently, one of two parts to be coupled is moved towards the other so that conical studs of one part are engaged in corresponding recesses of the other part and the coupling position is established by swinging one of said parts into its position of register, whereupon the two parts are coupled.

One form of invention, as applied to a two-wheel tractor to which for example a power-operated sowing machine is to be coupled, is shown in the accompanying drawing in which—

Figures 1, 2:
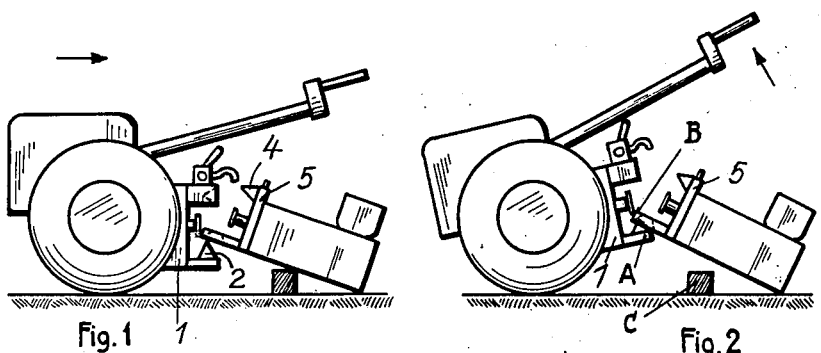
Figure 3:
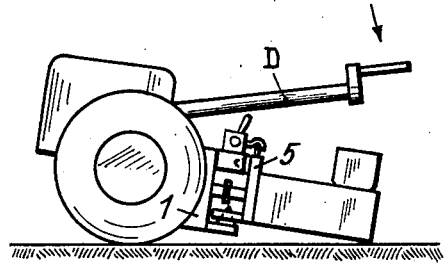
Figures 4, 5, 6, 7:
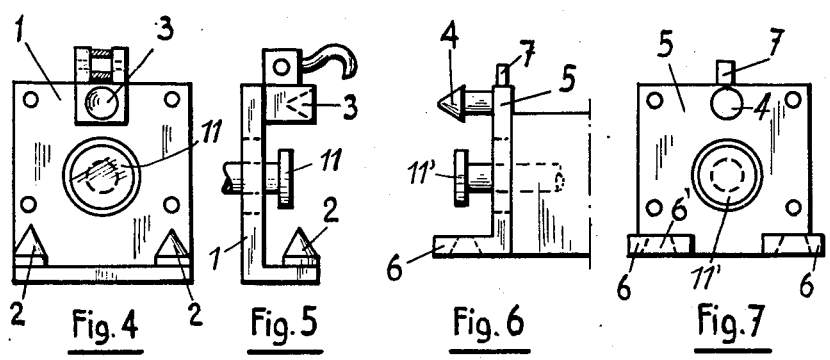
Figure 8:
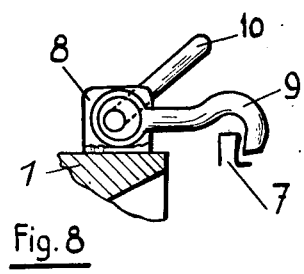

Fig. 1 is a side view of the tractor which has been moved near to the sowing machine propped up from the ground, Fig. 2 shows the same objects, the abutment B of the sowing machine having been raised by raising the respective abutment A, so as to permit of removing the prop C, Fig. 3 shows how, by lowering the handle bars D, the parts to be coupled are swung into the proper position in which they are interconnected by eccentric closure or similar means, Fig. 4 is an end view of one coupling part, Fig. 5 is a side view thereof, Fig. 6 is a side view of the other coupling part, Fig. 7 is an end view of the latter, and Fig. 8 shows a form of eccentric closure means in side view.

In Fig. 4, the numeral 1 denotes one coupling part which is an angularly formed plate adapted to be screwed onto a tractor for example. The plate 1 comprises conical studs 2 and a conical hole 3 which is adapted to engage a corresponding stud 4 of the second coupling part or plate 5 which is shown in Figs. 6 and 7 and is screwed onto an auxiliary apparatus, for example the sowing machine shown in Figs. 1–3. The plate 5 has two lugs or bosses 6 in the conical holes 6' of which the abutment studs and centering studs 2 are engaged. The numeral 7 denotes a catch provided on plate 5 for the eccentric closure means. The flange 11 is secured to a power take-off shaft which through a flange 11' may be coupled to the driving shaft of the sowing machine or the like.

In Fig. 8, the numeral 8 denotes bosses fixed to plate 1, while 9 is the hook of the eccentric closure means, which hook is engaged to the catch 7, and 10 is the eccentric and its handle. The abutment studs and centering studs 2 may be situated either in a horizontal or vertical plane.

What I claim as new and desire to secure by Letters Patent, is:

Coupling means for a tractor and an auxiliary machine to be operated from the tractor power take-off, comprising a body portion surrounding the end portion of a power shaft, a body portion surrounding the end portion of a drive shaft, horizontally disposed bracket portions extending from said body portions below and in parallel relation to the shafts associated therewith, a pair of upwardly extending conical studs on the bracket portion of one of said body portions, said studs being disposed on parallel axes lying in a plane perpendicular to said shaft and equidistant on opposite sides thereof, the bracket portion on the other body portion having a pair of conical holes disposed relative to the associated shaft to respectively fit over said conical studs and thereby align said shafts in a vertical plane, a lug extending from one body portion above the associated shaft and having a conical hole disposed on an axis parallel to and in a vertical plane wth the axis of said shaft, a conical stud to mate said latter hole and disposed on the other body portion on an axis parallel to and in a vertical plane with the axis of the associated shaft, the axes of said latter hole and stud being equidistant from the axes of the respective shafts and cooperative when mated to align said shafts in a horizontal plane, a keeper on the body portion adjacent said latter stud, and an eccentrically operated clamp on said lug for cooperation with said keeper to retain said latter stud mated in said hole and thereby retain said shaft in axial alignment.

ARNOLD RUTISHAUSER.

References Cited in the file of this patent

UNITED STATES PATENTS

| Number | Name | Date |
|---|---|---|
| 649,831 | Fuller | May 15, 1900 |
| 1,428,194 | Von Meyenburg | Sept. 5, 1922 |
| 1,482,944 | Russ | Feb. 5, 1924 |
| 1,680,236 | Zimmerman | Aug. 7, 1928 |